US009135024B2

(12) United States Patent
Kamay et al.

(10) Patent No.: US 9,135,024 B2
(45) Date of Patent: Sep. 15, 2015

(54) PLAYING MULTIMEDIA CONTENT AT REMOTE GRAPHICS DISPLAY CLIENT

(75) Inventors: Yaniv Kamay, Modi' (IL); Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 1098 days.

(21) Appl. No.: 12/325,233

(22) Filed: Nov. 30, 2008

(65) Prior Publication Data

US 2010/0138744 A1    Jun. 3, 2010

(51) Int. Cl.
*G06F 9/44*    (2006.01)

(52) U.S. Cl.
CPC ..................... *G06F 9/4445* (2013.01)

(58) Field of Classification Search
CPC ................. G06F 17/30017; G06F 17/30781; G06F 17/3074
USPC .......... 715/751, 733, 740, 749; 709/219, 203; 718/1
See application file for complete search history.

(56) References Cited

U.S. PATENT DOCUMENTS

| | | | | |
|---|---|---|---|---|
| 6,091,412 | A * | 7/2000 | Simonoff et al. | 715/749 |
| 7,275,212 | B2 * | 9/2007 | Leichtling | 715/733 |
| 7,487,454 | B2 * | 2/2009 | Czerwinski et al. | 715/751 |
| 7,681,134 | B1 * | 3/2010 | Grechishkin et al. | 715/740 |
| 7,958,453 | B1 * | 6/2011 | Taing | 715/744 |
| 8,099,512 | B2 * | 1/2012 | Katis et al. | 709/231 |
| 8,169,916 | B1 * | 5/2012 | Pai et al. | 370/238 |
| 8,170,123 | B1 * | 5/2012 | Hobgood et al. | 375/240.26 |
| 2004/0031058 | A1 * | 2/2004 | Reisman | 725/112 |
| 2005/0039133 | A1 * | 2/2005 | Wells et al. | 715/740 |
| 2006/0168526 | A1 * | 7/2006 | Stirbu | 715/740 |
| 2006/0256130 | A1 * | 11/2006 | Gonzalez | 345/619 |
| 2007/0106811 | A1 * | 5/2007 | Ryman | 709/230 |
| 2007/0174429 | A1 * | 7/2007 | Mazzaferri et al. | 709/218 |
| 2007/0192329 | A1 * | 8/2007 | Croft et al. | 707/10 |
| 2007/0204003 | A1 * | 8/2007 | Abramson | 709/217 |
| 2008/0008458 | A1 * | 1/2008 | Gudipaty et al. | 386/131 |
| 2008/0082691 | A1 * | 4/2008 | Hochwarth et al. | 709/246 |
| 2008/0114694 | A1 * | 5/2008 | Hamdane et al. | 705/59 |
| 2008/0209330 | A1 * | 8/2008 | Cruver | 715/733 |
| 2009/0019367 | A1 * | 1/2009 | Cavagnari et al. | 715/716 |
| 2009/0070687 | A1 * | 3/2009 | Mazzaferri | 715/751 |

(Continued)

OTHER PUBLICATIONS

Meyers. Interactive 3D with Shockwave. www.webtechniques.com Feb. 2002. accessed Aug. 2, 2011.*
Hoff. Netscape Plug-Ins. Linux J. 65es, Article 5. Sep. 1999.*
Qumranet, Solid ICE™, Connection Broker, Apr. 2008, 7 pages.

(Continued)

*Primary Examiner* — Amy M Levy
(74) *Attorney, Agent, or Firm* — Lowenstein Sandler LLP

(57) ABSTRACT

Method and apparatus for playing multimedia content at a remote graphics display client are described herein. According to one embodiment, a stream of data objects is sequentially transmitted to a client over a network. The stream is generated by a desktop application representing a snapshot of a display output of the desktop application. The data objects are to be rendered at the client for graphics remoting purposes. It is detected that a multimedia object is to be rendered by the desktop application. The multimedia object is caused to be rendered remotely at the client without having to render the multimedia object locally and without having to transmit a display result of the rendering to the client over the network. Other methods and apparatuses are also described.

17 Claims, 6 Drawing Sheets

(56) References Cited

U.S. PATENT DOCUMENTS

| | | | |
|---|---|---|---|
| 2009/0248802 A1* | 10/2009 | Mahajan et al. | 709/204 |
| 2009/0249222 A1* | 10/2009 | Schmidt et al. | 715/751 |
| 2009/0287772 A1* | 11/2009 | Stone et al. | 709/203 |
| 2010/0045662 A1* | 2/2010 | Boothroyd et al. | 345/419 |
| 2010/0077290 A1* | 3/2010 | Pueyo | 715/230 |
| 2011/0078532 A1* | 3/2011 | Vonog et al. | 714/752 |
| 2012/0246227 A1* | 9/2012 | Vonog et al. | 709/203 |

OTHER PUBLICATIONS

Qumranet, KVM-Kernel-based Virtualization Machine, White Paper, 2006, 5 pages.

Qumranet, Solid ICE™, Provisioning Manager, Apr. 2008, 5 pages.

Qumranet, Solid ICE™, Virtual Desktop Server (VDS), Apr. 2008, 6 pages.

"Solid ICE™ Overview," Qumranet Inc., Apr. 2008, 15 pages.

\* cited by examiner

PLAYING MULTIMEDIA CONTENT AT REMOTE GRAPHICS DISPLAY CLIENT

TECHNICAL FIELD

The present invention relates generally to graphics remoting. More particularly, this invention relates to playing multimedia content at a remote graphics display client.

BACKGROUND

Graphics remoting systems allow computing device network clients to connect to a remote server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

In some computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data.

Thus, input is received and output is presented at the client computer system, while processing actually occurs at the terminal server. In most, if not all terminal server environments, input data (entered at a client computer system) typically includes mouse and keyboard data representing commands to an application and output data (generated by an application at the terminal server) typically includes video data for display at a display device.

Recently, desktop virtualization or virtual desktop infrastructure has become more popular. Desktop virtualization is a server-centric computing model that borrows from the traditional thin-client model but is designed to give system administrators and end-users the best of the ability to host and centrally manage desktop virtual machines in the data center while giving end users a full PC desktop experience.

Desktop virtualization provides many of the advantages of a terminal server, while providing users with much more flexibility. Each user, for example, might be allowed to install and configure his/her own applications. Users also gain the ability to access their server-based virtual desktop from other locations. However, there has been a lack of efficient streaming mechanisms to improve network traffic and processing efficiency of the client in a desktop virtualization environment.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
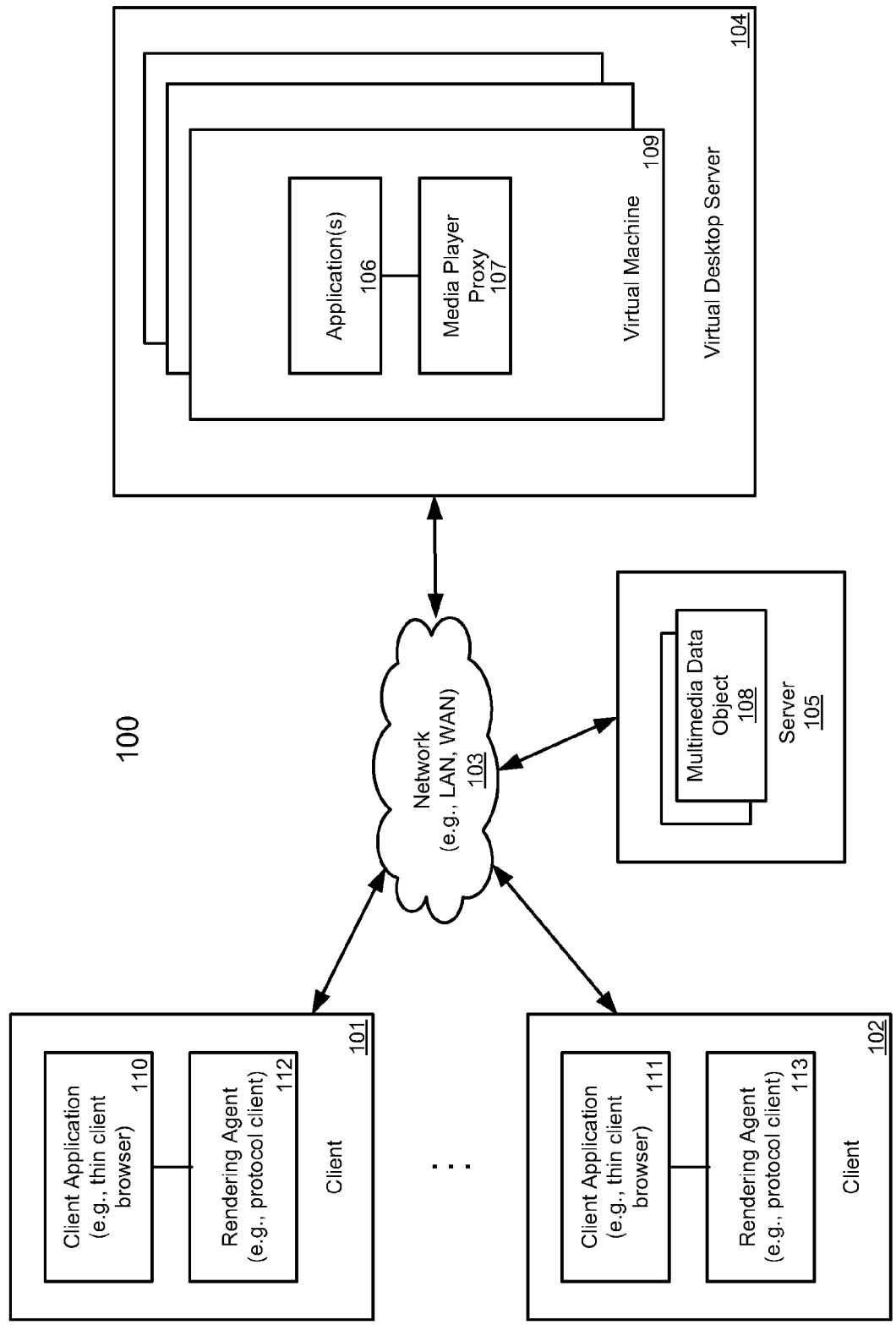
FIG. 1 is a block diagram illustrating an example of a network configuration according to one embodiment of the invention.

Method and apparatus for multimedia data object traffic redirection in a remote display system are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, a desktop application is executed within a virtual machine hosted by a server (e.g., hosting server). The display output of the desktop application is streamed to a client over a network, for example, in order to establish a virtual desktop environment at the client, while the desktop application is actually executed remotely at the server. In addition, certain activities of the desktop application are monitored at the hosting server. In response to detecting that a multimedia data object (e.g., a Flash object) is about to be rendered or executed within the local desktop application within the virtual machine, the virtual machine of the hosting server transmits the multimedia data object to the client to enable the client to render the multimedia data object locally at the client without having to render or execute the multimedia data object at the server and without having to transmit the display output of the rendering or execution to the client.

Alternatively, if the multimedia data object is located at a remote server (e.g., other than the hosting server) and reachable by the client, a link (e.g., URL or universal resource locator) referenced to the multimedia data object may be transmitted to the client without having to transmit the entire multimedia data object to the client. This would allow the client to download the multimedia data object from the remote server for rendering or execution. A decision regarding whether to transmit the whole multimedia data object or just a link to the multimedia data object to the client may be dynamically determined based on network traffic conditions and/or client's local processing bandwidth (e.g., CPU usage) at the point in time. Thus, since the multimedia data object is rendered or executed at the client instead of at the server, the server does not have to stream the display output (e.g., graphics data) of the rendering or execution of the multimedia data object to the client over the network. As a result, the network traffic between the client and the server has been reduced.

FIG. 1 is a block diagram illustrating an example of a network configuration according to one embodiment of the invention. Referring to FIG. 1, network configuration 100 includes, but is not limited to, one or more clients 101-102 communicatively coupled to a remote server or a cluster of servers 104 over a network 103. Network 103 may be a local area network (LAN) or a wide area network (WAN) and may be a combination of one or more networks. Clients 101-102 can be any computer system in communication with server 104 for remote execution of applications at server 104. For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., application 106) can generate output display commands (e.g., graphics commands, simply referred to herein as graphics data), which may include one or more paint and/or draw operations, for example, in the form of executable instructions. The output display commands can then be transmitted (e.g., as graphics update commands) with optional compression back to the remote client and a remote display driver (e.g., rendering agent 112) of the remote client can collect the graphics commands and generate corresponding drawing commands for rendering at a display device of the client.

In one embodiment, server 104 is configured to host one or more virtual machines 109, each having one or more desktop applications 106 (e.g., desktop operating system). Desktop application 106 may be executed and hosted by an operating environment (e.g., a host operating system, not shown) within virtual machine 109. Such an operating system in virtual machine 109 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows operating system from Microsoft and a host OS may be a Linux operating system available from Red Hat.

Virtual machine 109 can be any type of virtual machine, such as, for example, hardware emulation, full virtualization, para-virtualization, and operating system-level virtualization virtual machines. Different virtual machines hosted by server 104 may have the same or different privilege levels for accessing different resources.

In one embodiment, server 104, also referred to as a virtual desktop server (VDS), hosts multiple virtual machines (e.g., virtual machine 109), each hosting or maintaining a desktop environment remotely accessed by a client such as clients 101-102, in this example, virtual desktop 106. For the purpose of illustration, virtual desktop 106 represents an output (e.g., a snapshot of an image to be displayed) generated by a desktop application running within virtual machine 109. The virtual desktop 106 is then captured and streamed to a client such as clients 101-102, where the virtual desktop 106 may be rendered by a rendering agent (e.g., agents 112-113) and presented by a client application (e.g., applications 110-111) respectively. Note that throughout this application and for the purposes of illustration only, data to be transmitted from a server to a client represents a snapshot of a virtual desktop image. Typically, the data being transmitted includes graphics commands (e.g., paint and/or draw commands) as well as other information (e.g., location and/or shape, etc.) such that the client can execute or render the graphics commands to construct the associated virtual desktop image.

According to one embodiment, system 100 includes a media player proxy (also referred to as a media player agent or a virtual media player) 107 running within each virtual machine 109, which may include a data compressor and/or a resource manager for monitoring network traffic conditions and/or client local processing bandwidth. In addition, media player proxy 107 is configured to detect whether virtual desktop 106 is about to render or execute a multimedia data object, which may be a Flash® object that can be rendered by an Adobe® Flash® player. If so, media player proxy 107 may transmit the multimedia data object to the client for rendering or execution at the client without having to render or execute the multimedia data object within virtual machine 109 at server 104. Alternatively, if the multimedia data object is stored remotely, for example, as multimedia data object 108 stored in server 105, media player proxy 107 may simply transmit a link (e.g., URL of server 105) to the client to allow the client to download the multimedia data object from a remote server for rendering or execution.

Again, a decision regarding whether to transmit the whole multimedia data object or just a link to the multimedia data object to the client may be dynamically determined based on network traffic conditions, reachability, and/or client's local processing bandwidth (e.g., CPU usage) at the point in time. It can also be dependent upon whether the multimedia data object is stored locally or remotely. Thus, since the multimedia data object is rendered or executed at the client instead of at the server, the server does not have to transmit the display output of the rendering or execution of the multimedia data object to the client over the network. As a result, the network traffic between the client and the server has been reduced. Note that throughout this application, a media object is utilized as an example of a data object for rendering or execution. However, the techniques described herein can also be applied to other types of data objects.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

In one particular embodiment, VDS 104 is configured to run the virtualization platform/hypervisor and the virtual desktops. SPICE communication protocol is utilized to communicate between a client and a server. SPICE is a remote rendering technology developed specifically for virtual desktops that allow users to "see" their desktops and interact with them. In this embodiment, a user's desktop runs inside a kernel-based virtual machine (KVM) on VDS 104 in the enterprise data center. The user then accesses his/her desktop from a thin client (e.g., client application 110) using SPICE protocol. System 100 may be implemented as part of Solid ICE™ (independent computing environment) virtualization solution available from Qumranet. Note that an application related to a virtual desktop is utilized herein as an example throughout this application for illustration purposes only. However, techniques described herein can also be applied to any kinds of graphics remoting applications.

Figure 2:
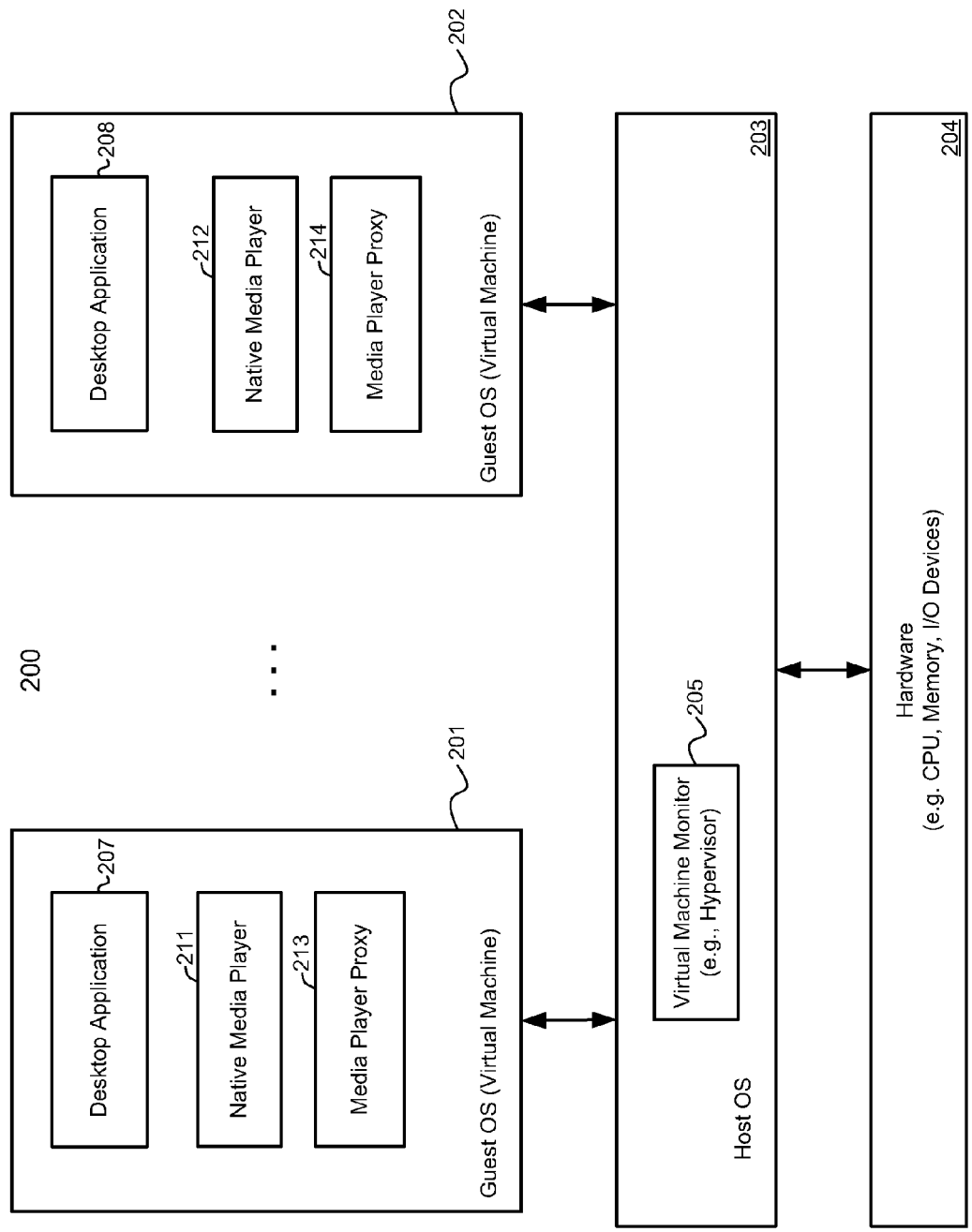
FIG. 2 is a block diagram illustrating an example of a system providing virtual desktop solutions according to one embodiment of the invention.

FIG. 2 is a block diagram illustrating an example of a system providing virtual desktop solutions according to one embodiment of the invention. For example, system 200 may be implemented as part of VDS 104 of FIG. 1. Referring to FIG. 2, system 200 includes one or more virtual machines 201-202 having guest operating systems which are managed by a host operating system 203. Host operating system 203 and guest operating systems 201-202 may be executed at different privilege levels and can be different operating systems, different versions of the same operating system, or different instances of the same operating system version.

In one embodiment, each guest OS implemented in a virtual machine hosts a virtual desktop for a remote client such as clients 101-102 of FIG. 1. For example, virtual machine 201 may be associated with client 101 of FIG. 1 and virtual machine 202 may be associated with client 102 of FIG. 1. When a client's desktop application (e.g., desktop application 207-208) is executed within the associated virtual machine (e.g., virtual machines/guest operating systems 201-202), a driver 209 (e.g., virtual display drivers) is configured to capture the output of the desktop application (e.g., snapshot image). In this example, each driver is implemented as a virtual display driver or an emulator (e.g., QEMU emulator) corresponding to a virtual graphics device maintained by the host 203. In one particular embodiment, a virtual display driver is a SPICE compatible driver.

According to one embodiment, a media player proxy (e.g., media proxies 213-214) is configured to detect whether a multimedia object (e.g., Flash® object) is about to be rendered or executed, where the multimedia object may be stored locally or remotely. In response, instead of rendering or executing the multimedia object within a virtual machine of system 200, the media player proxy may transmit the multimedia object to the client for rendering or execution at the client locally. Alternatively, if the multimedia object is stored in a remote server, the media player proxy may transmit a link (e.g., URL) referencing a storage location associated with the multimedia object of the remote server to the client, such that the client can download the multimedia object from the remote server for local execution. As a result, network traffic between the client and server 200 may be further reduced.

In one embodiment, in addition to detecting that a multimedia object is about to be rendered or executed, the media player proxy may further determine coordinates of a window (e.g., Flash® player's window) in which the multimedia object would be rendered or executed. The coordinates of the window is transmitted to the client such that the client can render or execute the multimedia object at the corresponding coordinates of the virtual desktop.

According to one embodiment, a native media player (e.g., native media players 211-212) may be maintained within a virtual desktop. A native media player is utilized to render or play a multimedia object locally within the virtual machine at the server under certain circumstances. For example, system 200 may operate as a stand along station in which a multimedia object is played locally by the native media player. When system 200 operates in a remote mode such as a graphics remoting system accessed remotely by a client (e.g., clients 101-102 of FIG. 1), a media player proxy is utilized without actually rendering or executing the multimedia object as described above.

In some situations, although system 200 operates in a remote mode; however, a client is not capable of rendering a multimedia object, a native media player can be utilized to render or execute the multimedia object at the host and transmit the display output of the rendering or execution to the client. Examples of a media player may include an ActiveX, Mozilla plug-in, and Windows™ graph manager component, etc. Communications between a media player proxy and a client can be performed through remoting protocol specific channel or an independent connection.

According to a specific embodiment, when a media player proxy draw into off-screen or in any other cases where the media player proxy is unaware of its position and/or its visibility region, the media player proxy will draw a watermark that contains an object ID and position; otherwise, the media player proxy will draw blackness. The media player proxy can handle a variety protocol commands, such as, for example, open stream and/or read stream. The remote media controller can handle a variety protocol commands, such as, for example, create player, set URL, destroy player, and/or set shape mode and position. On the client side, a window is created with a specified shape or a shape of a watermark, where the window is placed at a specified location or on top of the watermark.

Referring back to FIG. 2, system 200 further includes a virtual machine monitor (VMM) 205, also referred to as hypervisor. VMM 205, though typically implemented in software, may emulate and export a bare machine interface to higher level software. In one embodiment, VMM 205 may be implemented as a separate layer without the entire host OS 203 to mediate between a guest OS and the hardware 204. VMM 205 may be run within, or on top of, another VMM. VMM 205 may be implemented, for example, in hardware, software, firmware, or by a combination of various techniques.

According to one embodiment, VMM 205 may be implemented as a kernel module that enables a hypervisor feature within the host OS 203 (e.g., Linux kernel), also referred to as kernel-based virtual machine (KVM) virtualization, which is designed and maintained by Qumranet. In this example, VMM 205 is a kernel module running within the kernel space of the host OS 203. VMM 205 (also referred to as a KVM module) enables the kernel of the host OS 203 to be VMM/hypervisor capable. The guest OS (e.g., guest OS 201) is running in a guest mode (as a process) within a user space of the host OS 203. The virtual display driver (e.g., driver 209) is implemented as part of an emulator such as QEMU emulator, which exposes the hardware 204 as virtual hardware to the virtual desktop. In one embodiment, the virtual display driver is a SPICE capable driver. Further information regarding the KVM virtualization model will be described in details below.

Note that the virtual machine configuration as shown in FIG. 2 is provided for the purpose of illustration only. System 200 may also be applied to a variety of different kinds of virtual machine configurations, such as, for example, hardware emulation, full virtualization, para-virtualization, and operating system-level virtualization virtual machines. Further, although a guest OS and a virtual machine are sometimes interchangeably utilized throughout this application; a guest OS is typically executed within a virtual machine environment.

Referring back to FIG. 2, system 200 further includes platform hardware 204 representing a virtualization platform that is capable of executing a host operating system 203 and guest operating systems 201-202. Platform 204 can be of a personal computer (PC), mainframe, handheld device, portable computer, set-top box, or any other computing systems. Platform hardware 204 can include a processor, memory, input/output (I/O) devices, which can be, for example, a keyboard, a cursor control device, a display device, etc.

Furthermore, virtual graphics devices 206 represent graphics devices of one or more clients such as clients 101-102.

Specific characteristics of a client display device may be emulated via a virtual graphics device and/or a virtual display driver at the host. Each virtual graphics device may be adapted to emulate certain graphics operations, such as drawing lines, ellipses, fill areas, and displayed images, etc. Each virtual graphics device may be communicatively coupled to a client via a communication channel (e.g., socket connection). One or more virtual graphics devices may be associated with an individual client.

Further, according to one embodiment, a desktop optimizer (not shown) is utilized to further fine tune the environment for desktops. The desktop optimizer includes a memory optimizer (not shown) that allows memory page sharing across multiple virtual desktops (e.g., desktops 207-208) on the same server. In one embodiment, the memory optimizer scans the memory for identical memory pages and maintains only one copy. It shares memory pages at the host level (transparently to the guests) in a secure manner, and thereby helps significantly increase the density of virtual desktops on the server. The desktop optimizer further includes an adaptive remote rendering module (not shown) that in some cases processes graphics at the host level, if the client is not capable of rendering graphics. That is, graphics rendering processes may be performed at the client, host, or a combination of both dependent upon a specific operating environment (e.g., network traffic condition and/or client processing power, etc.) Other configurations may exist. Note that system 200 of FIG. 2 is shown for illustration purposes only. Other configurations may exist. For example, the virtual media player or media player proxy may be implemented within host OS 203.

Figure 3:
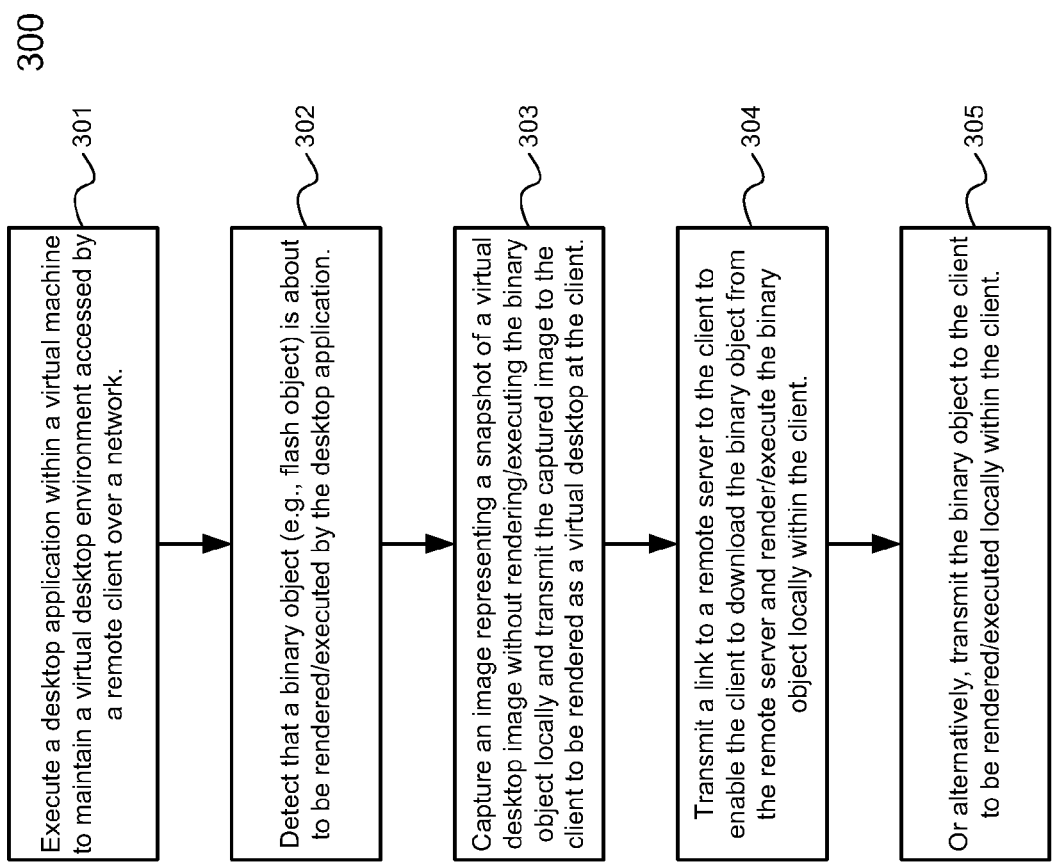
FIG. 3 is a flow diagram illustrating an example of a method for providing a virtual desktop according to one embodiment of the invention.

FIG. 3 is a flow diagram illustrating an example of a method for providing a virtual desktop according to one embodiment of the invention. Note that process 300 may be performed by processing logic which may include software, hardware, or a combination of both. For example, process 300 may be performed by system 200 of FIG. 2. Referring to FIG. 3, at block 301, a desktop application is executed within a virtual machine of a server to host a virtual desktop environment accessed by a remote client as a virtual desktop over a network. At block 302, processing logic detects that a multimedia data object is about to be rendered or executed by the desktop application. At block 303, an image representing a snapshot of a virtual desktop image is captured without rendering or executing the multimedia data object locally. The image is transmitted to the client to be rendered as a virtual desktop at the client. If the multimedia data object is stored at a remote location, at block 304, a link to the remote location is transmitted to the client to allow the client to download the multimedia data object and render/execute the same locally within the client. Alternatively, at block 305, the multimedia data object may be downloaded from the remote location and transmitted to the client for local rendering/execution within the client.

Figure 4:
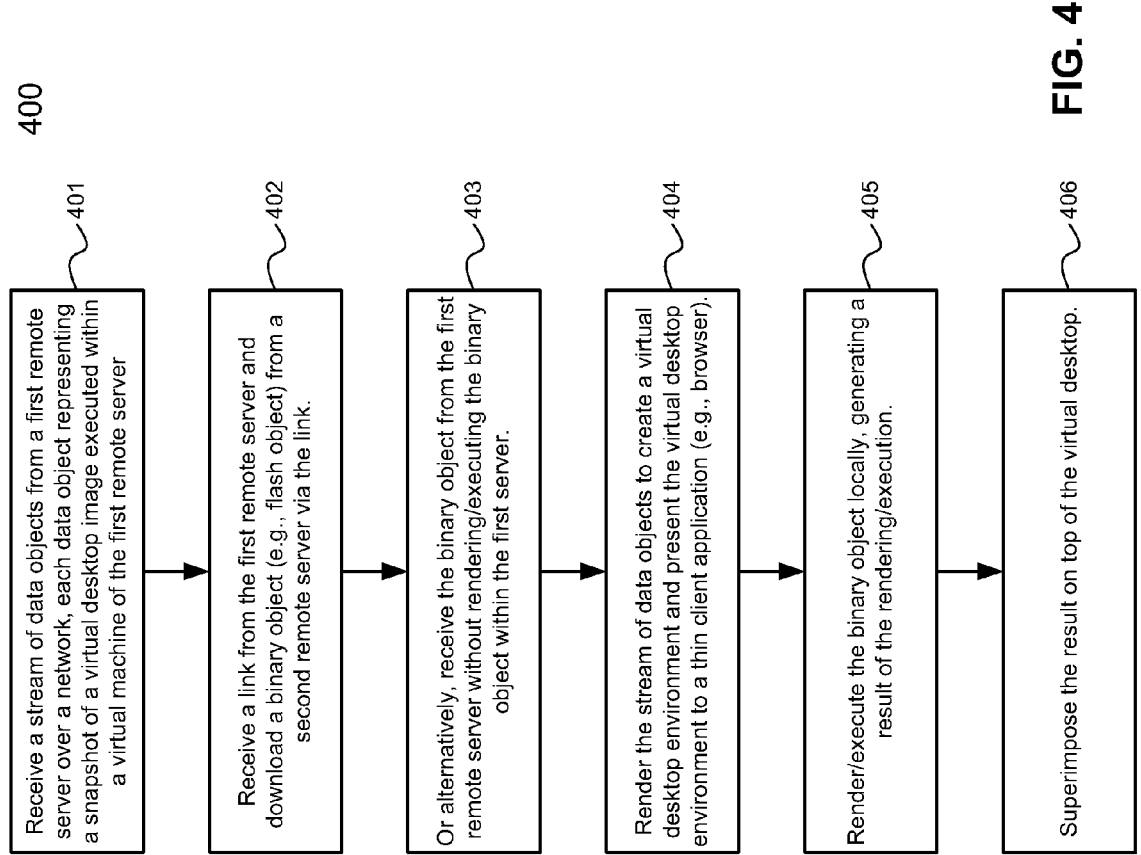
FIG. 4 is a flow diagram illustrating an example of a method for rendering a virtual desktop according to one embodiment of the invention.

FIG. 4 is a flow diagram illustrating an example of a method for rendering a virtual desktop according to one embodiment of the invention. Note that processing 400 may be performed by processing logic which may include software, hardware, or a combination of both. For example, process 400 may be performed by any of rendering agents 112-113 of clients 101-102 of FIG. 1. Referring to FIG. 4, at block 401, a stream of data objects is received at a client from a first remote server over a network. Each data object represents a snapshot of a virtual desktop image executed within the first remote server. In addition, at block 402, a link is received from the first remote server and a multimedia data object is downloaded from a second remote server via the link. Alternatively, at block 403, the multimedia data object is received from the first remote server without having the multimedia data object being executed at the first remote server. At block 404, the stream of data objects is rendered at the client to create a virtual desktop environment, which is presented to a thin client application (e.g., browser) at the client. At block 405, the multimedia data object is rendered or executed locally within the client, generating a result, and at block 406, the display result is superimposed on the top of the virtual desktop.

Figure 5:
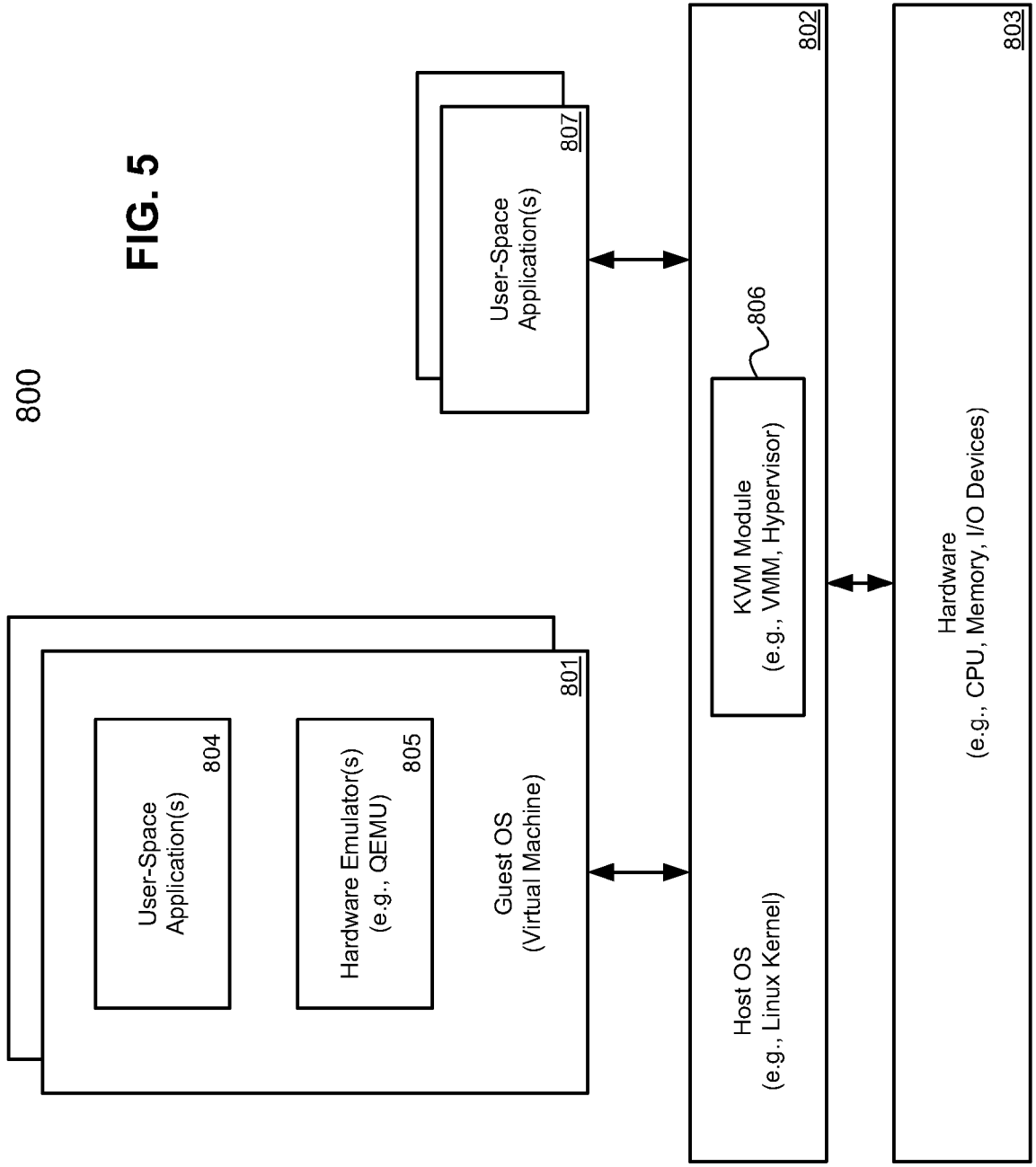
FIG. 5 is a block diagram illustrating an example of a kernel-based virtual machine architecture which may be used with an embodiment of the invention.

FIG. 5 is a block diagram illustrating an example of a kernel-based virtual machine architecture which may be used with an embodiment of the invention. For example, architecture 800 may be implemented as part of virtual machine architecture as shown in FIG. 2. User space application 804 may be implemented as part of virtual desktop application while hardware emulator may include a desktop optimizer described above.

Referring to FIG. 5, virtual machine architecture 800 is also referred to as kernel-based virtual machine (KVM) virtualization. The approach of KVM architecture is to turn a host operating system's kernel into a hypervisor using a kernel module. The kernel module exports a device (e.g., /dev/kvm in a Linux environment), which enables a guest mode of the kernel (in addition to the traditional kernel and user modes). In the guest mode, each VM has its own address space separate from that of the kernel or any other VM that is running. Because the standard OS kernel (e.g., Linux kernel) is the hypervisor, it benefits from the changes to the standard kernel (e.g., memory support, scheduler, etc.) Optimizations to these standard components benefit both the hypervisor (e.g., the host operating system) and the guest operating systems.

Referring to FIG. 5, at the bottom is a hardware platform 803 to be virtualized. Running on the bare hardware 803 is the hypervisor (e.g., the host OS kernel 802 with KVM module 806). This hypervisor looks just like a regular kernel (e.g., Linux kernel) on which other applications 807 can be executed. But this kernel 802 can also support guest operating systems 801 running in a guest mode. The guest mode is used for execution of a guest operating system code. Typically, kernel mode represents the privileged mode for code execution, while user mode represents the non-privileged mode (for programs running outside of the kernel).

Guest mode exists to execute guest operating system code but only for code that is non-I/O. The guest mode provides to the standard modes, so that a guest operating system can run in guest mode but also support the standard kernel and user modes for its kernel and user-space applications (e.g., application 804). The user mode of a guest operating system exists to perform I/O, which is independently managed.

Performing I/O from a guest operating system 801 is provided with a hardware emulator 805 (e.g., QEMU compatible emulator). Emulator 805 may be used to virtualize an entire computing environment including disks, graphic adapters, and network devices, etc. Any I/O requests a guest operating system 801 makes are intercepted and routed to the user mode to be emulated by emulator 805. KVM provides virtualization of memory through the exported device (e.g., /dev/kvm in a Linux environment). Each guest operating system has its own address space that is mapped when the guest is instantiated. Other configurations may exist.

Figure 6:
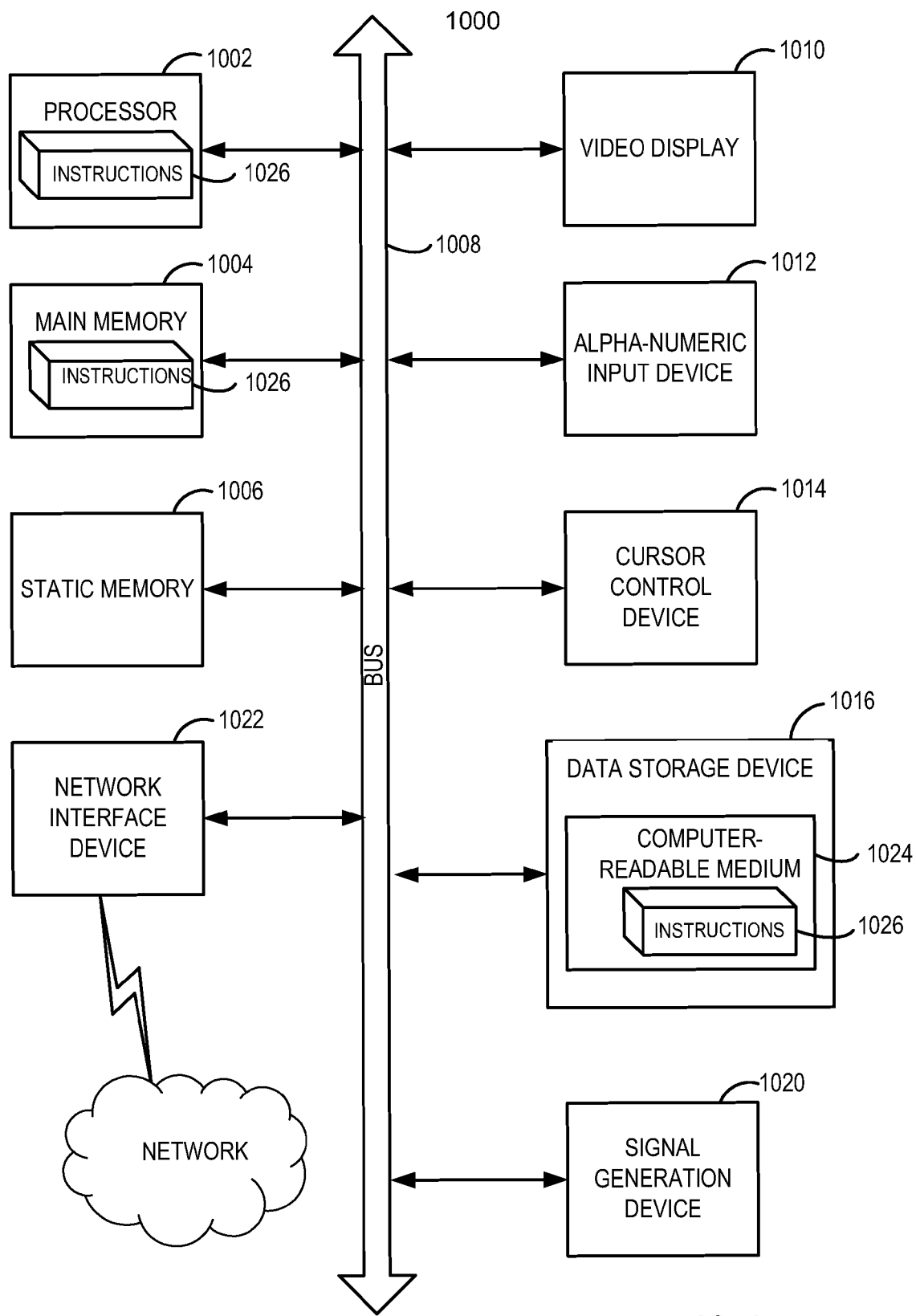
FIG. 6 is a block diagram illustrating an example of a data processing system which may be used with an embodiment of the invention.

FIG. 6 is a block diagram illustrating a data processing system which may be used with an embodiment of the invention. For example, system 1000 may be implemented as part of a client and/or a server described above. System 1000 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored one or more sets of instructions 1026 (e.g., software) embodying any one or more of the methodologies or functions described herein. The software may also reside, completely or at least partially, within the main memory 1004 and/or within the processor 1002 during execution thereof by the computer system 1000, the main memory 1004 and the processor 1002 also constituting machine-accessible storage media. The software may further be transmitted or received over a network via the network interface device 1022.

Thus, method and apparatus for multimedia data object traffic redirection in a virtual desktop environment have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   transmitting, by a processing device of a host server executing a virtual machine, a stream of data objects to a client over a network, the stream being generated by a desktop application of the processing device, representing a snapshot of a display output of the desktop application of the processing device, the data objects to be rendered at the client;

detecting, by the processing device of the host server, that a media object is to be rendered from the desktop application;
determining, by the processing device of the host server, in view of at least one of a network condition or a processing bandwidth condition to transmit a link to a remote server comprising the media object, wherein the network condition or the processing bandwidth condition is monitored by a virtual media player executed by the virtual machine; and
transmitting, in response to the detecting and determining, the link to the remote server comprising the media object to the client to allow the client to download the media object from the remote server and render the media object at the client without having to render the media object locally by the processing device of the host server and without having to transmit a display result of the rendering from the processing device of the host server to the client over the network.

2. The method of claim 1, further comprising:
determining a window location within a desktop image representing the snapshot of the display output of the desktop application in which the media object is supposed to be rendered and displayed; and
transmitting the window location to the client such that when the media object is rendered at the client, a display result of the rendering is displayed and superimposed approximately within the window location relative to the desktop image at the client.

3. The method of claim 2, further comprising:
constructing the link to the media object comprising a reference to a storage location of the remote server in which the media object is stored.

4. The method of claim 2, wherein the media object is a Flash® object, and wherein the Flash® object is rendered at the client using a Flash® player.

5. The method of claim 1, wherein the desktop application is executed within a guest operating system (OS) within the virtual machine (VM) of the processing device, wherein the guest OS and the VM are hosted by a host OS which virtualizes underlying hardware to the guest OS and the VM.

6. The method of claim 5, wherein the guest OS and the VM are running as a process in a user space of the host OS, wherein the host OS comprises a kernel module running within a kernel space of the host OS which enables kernel of the host OS to be a hypervisor for managing the VM, and wherein the guest OS comprises a hardware emulator for emulating the underlying hardware which is exposed by the kernel module.

7. The method of claim 5, wherein the desktop image is presented by a thin client application running within the client as part of a virtual desktop at the client.

8. A non-transitory computer readable storage medium including instructions that, when executed by a processing device, cause the processing device to:
transmit, by the processing device of a host server executing a virtual machine, a stream of data objects to a client over a network, the stream being generated by a desktop application of the processing device representing a snapshot of a display output of the desktop application, the data objects to be rendered at the client;
detect, by the processing device, that a media object is to be rendered from the desktop application;
determine in view of at least one of a network condition to transmit a link to a remote server comprising the media object, wherein the network condition or the processing bandwidth condition is monitored by a virtual media player executed by the virtual machine; and
transmit, in response to the detecting and determining, the link to the remote server comprising the media object to the client to allow the client to download the media object from the remote server and render the media object at the client without having to render the media object locally by the processing device of the host server and without having to transmit a display result of the rendering from the processing device of the host server to the client over the network.

9. The non-transitory computer readable storage medium of claim 8, the processing device to:
determine a window location within a desktop image representing a snapshot of the display output of the desktop application in which the media object is supposed to be rendered and displayed; and
transmit the window location to the client such that when the media object is rendered at the client, a display result of the rendering is displayed and superimposed approximately within the window location relative to the desktop image at the client.

10. The non-transitory computer readable storage medium of claim 9, the processing device to:
construct the link to the media object comprising a reference to a storage location of the remote server in which the media object is stored.

11. The non-transitory computer readable storage medium of claim 9, wherein the media object is a Flash® object, and wherein the Flash® object is rendered at the client using a Flash® player.

12. The non-transitory computer readable storage medium of claim 8, wherein the desktop application is executed within a guest operating system (OS) within the virtual machine (VM), wherein the guest OS and the VM are hosted by a host OS which virtualizes underlying hardware to the guest OS and the VM.

13. The non-transitory computer readable storage medium of claim 12, the guest OS and the VM to execute as a process in a user space of the host OS, wherein the host OS comprises a kernel module running within a kernel space of the host OS which enables kernel of the host OS to be a hypervisor for managing the VM, and wherein the guest OS comprises a hardware emulator for emulating the underlying hardware which is exposed by the kernel module.

14. The non-transitory computer readable storage medium of claim 12, wherein the image is presented by a thin client application to execute within the client as part of a virtual desktop at the client.

15. A system comprising:
a memory comprising instructions; and
a processing device of a host server, the processing device operatively coupled to the memory to execute the instructions to:
transmit a stream of data objects to a client over a network, the stream being generated by a desktop application of the processing device representing a snapshot of a display output of the desktop application of the processing device, the data objects to be rendered at the client,
detect that a media object is to be rendered from the desktop application,
determine in view of at least one of a network condition to transmit a link to a remote server comprising the media object, wherein the network condition or the processing bandwidth condition is monitored by a virtual media player executed by the virtual machine, and transmit the link to the remote server comprising the media object to the client to allow the client to download the media object from the remote server and render the media object at the client without having to render the media object locally by the processing device of the host server and without having to transmit a display result of the rendering from the processing device of the host server to the client over the network.

16. The system of claim 15, the processing device to:
determine a window location within a desktop image representing a snapshot of the display output of the desktop application in which the media object is supposed to be rendered and displayed,
transmit the window location to the client such that when the media object is rendered at the client, a display result of the rendering is displayed, and
superimpose approximately within the window location relative to the desktop image at the client.

17. The system of claim 16, the processing device to:
construct the link to the detected media object comprising a reference to a storage location of the remote server in which the media object is stored.

* * * * *